(12) United States Patent
Caruso et al.

(10) Patent No.: US 9,394,937 B2
(45) Date of Patent: Jul. 19, 2016

(54) ELASTOMERIC TEETERING HINGE

(76) Inventors: Silvestro Caruso, London (GB); Martin Jakubowski, London (GB); Luciano Caioli, London (GB)

(*) Notice: Subject to any disclaimer, the term of this patent is extended or adjusted under 35 U.S.C. 154(b) by 38 days.

(21) Appl. No.: 14/116,487

(22) PCT Filed: May 10, 2012

(86) PCT No.: PCT/IB2012/001183
§ 371 (c)(1),
(2), (4) Date: Apr. 15, 2014

(87) PCT Pub. No.: WO2012/153197
PCT Pub. Date: Nov. 15, 2012

(65) Prior Publication Data
US 2014/0226926 A1    Aug. 14, 2014

Related U.S. Application Data

(60) Provisional application No. 61/484,343, filed on May 10, 2011.

(51) Int. Cl.
*F16F 1/387* (2006.01)
*F16F 3/12* (2006.01)
(Continued)

(52) U.S. Cl.
CPC .............. *F16C 17/06* (2013.01); *F03D 1/0658* (2013.01); *F05B 2240/2022* (2013.01); *F05B 2240/50* (2013.01); *F05B 2260/79* (2013.01);
(Continued)

(58) Field of Classification Search
CPC ............. F16F 1/40; F16F 9/306; F16F 1/371; F16F 1/387; F16F 1/3876; F16F 3/10; F16F 3/12; F16F 2228/08; F05B 2240/50; F05B 2260/79; F05B 2240/54; F16C 17/03; F16C 17/06
USPC ........................ 267/140.3, 140.4, 141.1, 294; 416/134 R, 134 A
See application file for complete search history.

(56) References Cited

U.S. PATENT DOCUMENTS 4,293,277 A * 10/1981 Aubry ........................ 416/134 A
4,395,143 A * 7/1983 Bakken ................. F16F 1/3935
  384/221
(Continued)

FOREIGN PATENT DOCUMENTS

CN    201771692 U    3/2011
DE    20205396 U1    11/2002
(Continued)

OTHER PUBLICATIONS

Carlin et al., 2001, The History and State of the Art of Variable-Speed Wind Turbine Technology, National Renewable Energy Laboratory, (68 pages).
(Continued)

*Primary Examiner* — Thomas J Williams
(74) *Attorney, Agent, or Firm* — Mark S. Leonardo; Brown Rudnick LLP

(57) ABSTRACT

The invention generally relates to two-bladed turbine nacelles and associated teetering hinges. In certain embodiments, the invention provides a hinge assembly encompassing a hub and two double elastomeric teeter bearings. In some aspects, the bearings are self-contained elements that can be preloaded in a controlled manner prior to their incorporation into the larger assembly.

16 Claims, 9 Drawing Sheets

(51) Int. Cl.
*F16C 17/06* (2006.01)
*F03D 1/06* (2006.01)

(52) U.S. Cl.
CPC . *F05B2270/1095* (2013.01); *F05B 2280/4003* (2013.01); *F16F 1/387* (2013.01); *F16F 3/12* (2013.01); *F16F 2228/08* (2013.01); *Y02E 10/721* (2013.01)

(56) References Cited

U.S. PATENT DOCUMENTS

| | | | |
|---|---|---|---|
| 4,435,646 A | | 3/1984 | Coleman et al. |
| 4,439,105 A | | 3/1984 | Hohenemser |
| 4,565,929 A | | 1/1986 | Baskin et al. |
| 4,703,189 A | | 10/1987 | DiValentin et al. |
| 4,815,936 A | | 3/1989 | Stoltze et al. |
| 4,859,148 A | * | 8/1989 | Hibyan ............... F16F 1/41 267/140.2 |
| 5,228,664 A | * | 7/1993 | Moulinet ............. 267/141.1 |
| 6,361,275 B1 | | 3/2002 | Wobben |
| 6,420,795 B1 | | 7/2002 | Mikhail et al. |
| 7,097,169 B2 | * | 8/2006 | Mueller ............... 267/141.1 |
| 8,020,831 B2 | * | 9/2011 | Dron et al. ........... 267/141.1 |
| 2002/0047277 A1 | | 4/2002 | Willis et al. |
| 2003/0068104 A1 | | 4/2003 | Loftus |
| 2004/0151584 A1 | | 8/2004 | Blakemore |
| 2006/0070435 A1 | | 4/2006 | LeMieux et al. |
| 2010/0133827 A1 | | 6/2010 | Huang et al. |
| 2010/0203983 A1 | | 8/2010 | Stites |
| 2010/0226772 A1 | | 9/2010 | Deering |
| 2014/0212288 A1 | | 7/2014 | Jakubowski et al. |
| 2014/0217238 A1 | | 8/2014 | Jakubowski et al. |
| 2014/0217742 A1 | | 8/2014 | Caruso et al. |
| 2014/0219796 A1 | | 8/2014 | Caruso et al. |
| 2014/0226926 A1 | | 8/2014 | Caruso et al. |

FOREIGN PATENT DOCUMENTS

| | | |
|---|---|---|
| EP | 0995904 A2 | 4/2000 |
| EP | 1134410 A1 | 9/2001 |
| EP | 1890034 A1 | 2/2008 |
| EP | 2128431 A2 | 12/2009 |
| EP | 2302206 A1 | 3/2011 |
| GB | 2107794 A | 5/1983 |
| JP | 2006-207502 A | 8/2006 |
| WO | 02/079647 A1 | 10/2002 |
| WO | 2009/080047 A2 | 7/2009 |
| WO | 2009/132671 A2 | 11/2009 |
| WO | 2010/072190 A2 | 7/2010 |
| WO | 2010/128378 A2 | 11/2010 |
| WO | 2011/042369 A2 | 4/2011 |
| WO | 2012/150502 A1 | 11/2012 |
| WO | 2012/150502 A4 | 11/2012 |
| WO | 2012/153185 A1 | 11/2012 |
| WO | 2012/153197 A2 | 11/2012 |
| WO | 2012/153197 A3 | 11/2012 |
| WO | 2012/153197 A4 | 11/2012 |
| WO | 2012/160446 A2 | 11/2012 |
| WO | 2012/160446 A3 | 11/2012 |
| WO | 2012/160446 A4 | 11/2012 |
| WO | 2012/164387 A1 | 12/2012 |
| WO | 2012/164387 A4 | 12/2012 |
| WO | 2013/027127 A4 | 12/2012 |
| WO | 2013/027127 A2 | 2/2013 |

OTHER PUBLICATIONS

IEA Wind 1989 Annual Report.
IEA Wind 1990 Annual Report.
IEA Wind 1992 Annual Report.
IEA Wind LS WECS 1988 Annual Report.
IEA Wind LS WECS 1989 Annual Report.
International Preliminary Search Report on Patentability for PCT/IB2012/001015 with the date of issuance of Nov. 12, 2013, (8 pages).
International Preliminary Search Report on Patentability for PCT/IB2012/001041 with the date of issuance of Nov. 5, 2013, (14 pages).
International Preliminary Search Report on Patentability for PCT/IB2012/001106 with the date of issuance of Dec. 2, 2013, (10 pages).
International Preliminary Search Report on Patentability for PCT/IB2012/001118 with the date of issuance of Nov. 26, 2013, (13 pages).
International Preliminary Search Report on Patentability for PCT/IB2012/001183 with the date of issuance of Nov. 12, 2013, (14 pages).
International Preliminary Search Report on Patentability for PCT/IB2012/002704 with the date of issuance of Nov. 12, 2013, (15 pages).
Wind Stats Report 2011.

* cited by examiner

ELASTOMERIC TEETERING HINGE

REFERENCE TO RELATED APPLICATIONS

This application claims priority to U.S. Provisional Application No. 61/484,343, filed May 10, 2011, the content of which is herein incorporated by reference in its entirety.

FIELD OF THE INVENTION

The invention generally relates to offshore wind turbines and associated teetering hinges.

BACKGROUND

Wind power refers to the conversion of wind energy into more useful forms of energy, such as electricity. Wind energy is an attractive alternative to fossil fuels because it is plentiful, renewable, widely distributed, clean, and produces no greenhouse gas emissions. Wind energy currently accounts for about 1.5% of worldwide electricity usage, and approximately eighty countries around the world use wind power on a commercial basis (World Wind Energy Report 2008: Report, World Wind Energy Association, Feb. 2009; and Worldwatch Institute: Wind Power Increase in 2008 Exceeds 10-year Average Growth Rate, May 2009). Further, world wind generation capacity has more than quadrupled between the years 2000 and 2006, doubling about every three years.

Offshore wind turbines harness the energy of powerful winds native to deep sea waters to provide electricity. Although necessary for energy production, these same strong winds result in asymmetrical loads that act on the rotor blades of the turbine, in what are known as bending moments. These high loads are subsequently transferred to the turbine shaft and ultimately, to the gearbox of the turbine, which results in gearbox failure and the unavailability of the turbine. Attempts to mitigate the high structural loads associated with bending moments include attaching the rotor blades to a flexible structure with limited pivoting capability, known as teetering hinge.

Conventional teetering hinges are based on mechanical devices that use bushings or ball bearings. Due to the rigid nature of these devices, conventional teetering hinges lack substantial capability to absorb sharp dynamic loads. Furthermore, the continued exposure to high loads combined with the limited angling ability of the hinge results in the degradation of the metallic bearings by pitting. Also, the need to center the rotor blade axis back to a point perpendicular to the shaft axis requires complicated centering devices based on metallic or elastomeric springs outside the bearing itself.

Other conventional teetering hinges are based on single metal-elastomeric bearings. In these devices, the preload cannot be controlled or adjusted. Rather, the preload is obtained by permanently transferring loads to the hub and the shaft, which causes unnecessary and potentially dangerous stress over the life of the system Like the conventional teeter hinges based on mechanical devices, these hinges also provide less than optimal reliability.

Accordingly, there is a need for a teetering hinge suitable for two-bladed wind turbines with improved reliability, better durability, and the enhanced ability to handle high structural loads.

SUMMARY

The invention generally relates to teetering hinge assemblies encompassing two double elastomeric teeter bearings. It has been found that a teetering hinge assembly encompassing two double elastomeric teeter bearings offers improved reliability and enhanced capability to handle load peaks over existing teetering hinges based on bushings or ball bearings. Unlike existing teeter hinges based on metallic bearings, the use of elastomeric elements in the encompassed teeter hinge confers the ability to absorb sharp dynamic loads produced by strong winds and handle the small teetering angles that would result in the degradation of typical hinge assemblies.

The present invention encompasses the adoption of double elastomeric teeter bearings that comprise preloadable elastomeric elements spaced by metal shims, which provides certain benefits over conventional assemblies. The elastomeric layers are not subject to the same types of wear and tear associated with conventional mechanical hinges and furthermore offer enhanced dampening of load peaks, which reduces the stress placed on the rotor and shaft. In certain aspects of the invention, the inclusion of a safety element, such as a radial sliding bearing, restricts the stress transferred to the elastomeric layers and serves as a fallback measure should the elastomeric layers collapse.

The double teeter bearing encompassed by the invention is designed to be pre-stressed through a preload prior to its incorporation into the hub and further designed so that the preload can be adjusted throughout the life of the assembly. In addition, the contemplated teeter bearing is composed of a plurality of metal-elastomeric elements. Each metal-elastomeric element is individually preloadable and furthermore, can be individually removed from the bearing without affecting the other elements. In addition to the elastomeric elements, many other components of the contemplated assembly can be removed individually without affecting the other components. These individually removable components encompassed by the invention facilitate maintenance and repair of the teeter bearing. The invention also encompasses teeter bearings that are self-contained units, even when incorporated into the turbine hub. Because the teeter bearings encompassed by the invention can function as self-contained units, the preload of the elastomeric elements is confined to the teeter system and not transferred into any associated hub.

In certain embodiments of the invention, an assembly is provided. The assembly includes a hub and at least two double elastomeric teeter bearings that are positioned at openings in the hub. In certain aspects, the teeter bearings are preloadable teeter bearings. The preloadable teeter bearings can be preloaded prior to integration with the hub. The teeter bearings can also comprise self-contained units that are separate from the hub. In other embodiments of the invention, the self-contained teeter bearings are operably configured not to transfer a preload to the hub. The teeter bearings, in some embodiments, are mounted on opposite ends of a T-shaped turbine shaft head placed inside the hub. In certain embodiments the teeter bearing has, among its components, a plurality of metal-elastomeric elements. Each metal-elastomeric element can be independently preloadable and furthermore, each metal-elastomeric element can be individually removed from the teeter bearing. Other embodiments of the invention include a sliding bearing coupled to the elastomeric teeter bearing which is operably configured to receive a force in excess of the rated force bearable by the elastomeric elements or to constrain the displacements of the rotor hub in case the elastomeric elements fail. In addition to these embodiments, additional aspects of the invention will become evident upon reading the present disclosure.

DETAILED DESCRIPTION

Figure 1A:
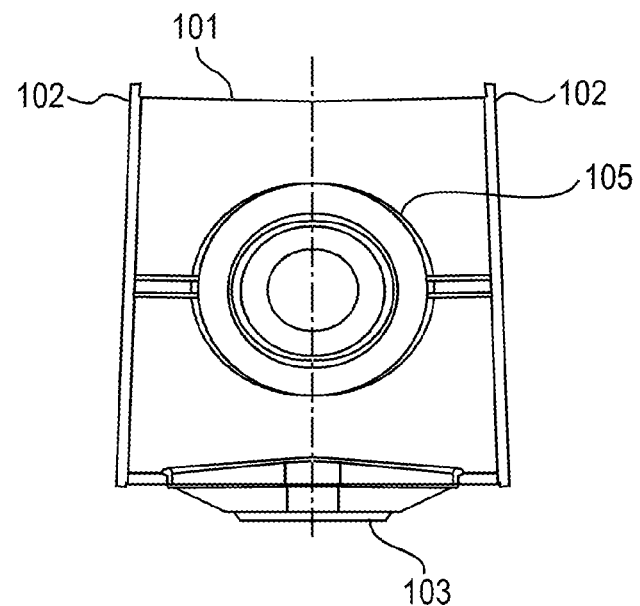
FIGS. 1A, 1B, 1C, 1D, and 1E depict an embodiment of the invention, from different perspectives.

The invention provides a hinge assembly encompassing a hub and two double elastomeric teeter bearings. In contrast to conventional assemblies that incorporate metallic bearings or bushings, the use of elastomeric elements results in an assembly with improved resistance to degradation and enhanced ability to dampen load peaks and reduce stress on the turbine rotor and shaft.

In certain embodiments of the invention, the teeter bearings are positioned at openings in the hub. The openings for the teeter bearings can be anywhere in the hub, but in some embodiments, there are two openings for the bearings, each located directly opposite from each other on the hub. In certain embodiments, the teeter bearings are operably configured to be mounted on the opposite ends of a T-shaped turbine shaft head, i.e., the horns of the shaft head. The horns of the shaft head would correspond to openings on the hub so that the mounted teeter bearings are positioned at the openings.

Each double elastomeric teeter bearings comprises two elastomeric layers, hence, a double elastomeric teeter bearing. The elastomeric layers themselves are comprised of a plurality of elastomeric elements. Accordingly, each elastomeric teeter containing these layers comprises a plurality of elastomeric elements. Due to the elastomeric elements, the teeter bearing encompassed by the invention are preloadable, in which a certain amount of compression can be introduced into the elastomeric element. The elastomeric elements contemplated by the invention allow for controlled preloading. As described in detail in the embodiments below, the preload of each elastomeric element can be adjusted independently of one another. Furthermore, as explained in detail below, each elastomeric element in the teeter bearing can be removed independently of the other elastomeric elements. In addition, the other components of the teeter assembly can be removed independent of other components in the assembly. For example, each elastomeric element can be coupled with a segmented inner part of the bearing on one end of the element and a segmented outer part on the other end of the element. Each segmented section (inner part, outer part, and elastomeric element in between) can be associated with individual wedges, which, in combination with fastening devices (e.g. screws) permit individually adjusting the preload. The prestress of the elastic parts can be obtained by compressing them in a prevalently radial direction, which is in the direction of the prevalent external loads, through the use of a system of wedges arranged between them and the external shell of the teeter bearing. The independence of the components also facilitates their removal from and installation into the bearing. Thus, the components encompassed by certain embodiments of the invention are more accessible for the maintenance and repair of the hinge assembly.

In some embodiments, the teeter bearing further comprises a sliding bearing operably configured to receive a force from elastomeric element. The sliding bearings can be coupled to the elastomeric teeters and protect the elastomeric parts from excessive stress, enhancing the overall reliability of the teeter bearing. As further described in the embodiments below, the teetering bearings can be equipped with monitoring sensors that enable early detection of possible wear in the elastomeric elements, as well as optical sensors that permit visual examination of the boundaries of elastomeric parts. Furthermore, the teetering bearings can be equipped with sensors able to monitor the behavior of the elastomeric elements in the operating hinge as they undergo cycles of oscillations. In other embodiments, the teeter bearings can be equipped with covers that protect the bearing from the effects of sun and salty air, which can potentially corrode the components within the bearing.

Figure 1B:
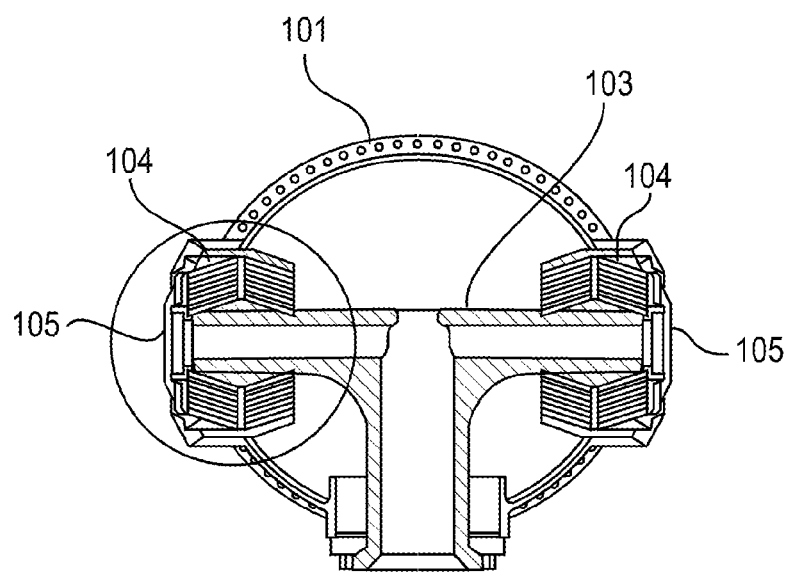

One assembly in accordance with the invention is presented in FIGS. 1A, 1B, 1C, 1D, and 1E. FIG. 1A shows an arrangement of two-bladed rotor and associated hub. The hub 101 is essentially a shell in which the two blades (not shown) are mounted at attachment points 102. The hub 101 contains an opening for a shaft head 103 and two openings located on opposite sides for teeter bearings 104 (not shown in FIG. 1A) that are mounted under a cover 105. FIG. 1B is a cross-sectional view of the hub assembly, and shows the inside of the hub 101, along with the shaft head 103 and two teeter bearings 104 located on opposite horns of the shaft head 103.

Figure 1C:
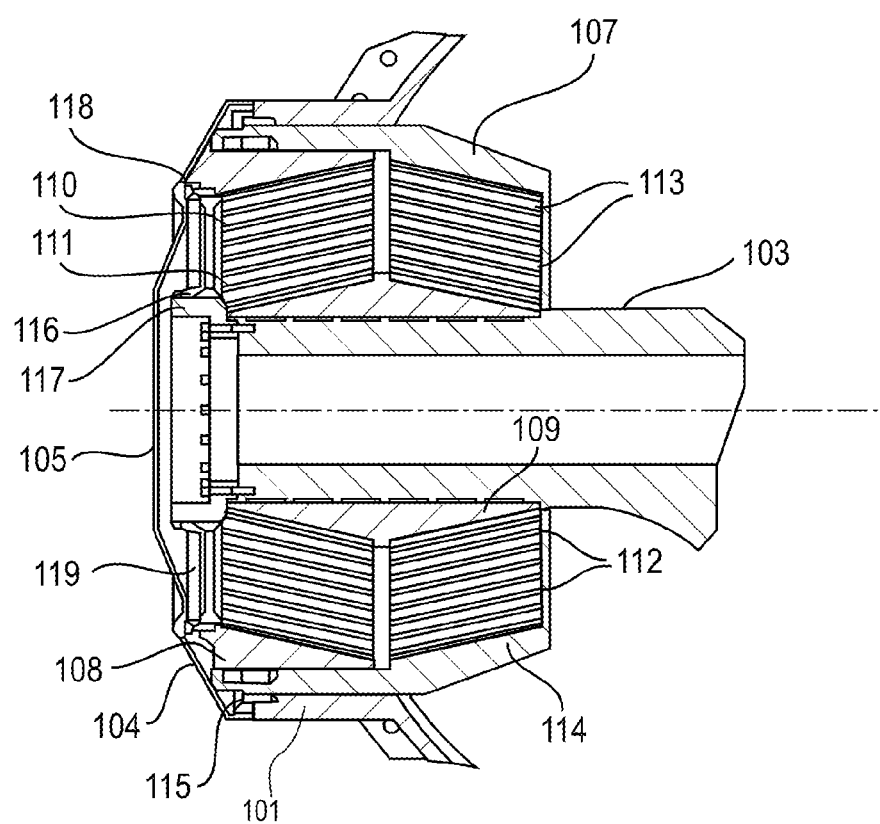

FIG. 1C presents a magnified view of the teeter bearing 104. The teeter bearing 104 is composed of an outer shell 107, an inner shell 108, a central sleeve 109, and two couples of metal-elastomeric elements, 110 and 111, stacked one into the other, with each element comprising alternating metal shims 112 and elastomeric layers 113. Keys 114 have been installed to prevent mutual rotation of the parts, however, other anti-rotation devices can be used in accordance with the present invention. The teeter bearing 104 is fixed to the hub 101 by screws 115, although other fastening devices can be used. The sliding bearing 116, which protects the teeter bearings from excess stress and assists in the event of elastomeric layer failure, is secured by a retaining element 117 onto the end of the horn of the shaft head 103. In certain embodiments, multiple slide bearings could be mounted as desired. A ring 118, which gives the slide bearing freedom to move axially and with a limited radial gap, can be installed to receive position sensors or angular sensors such as the differential transformer 119 shown. The number of sensors and their positions can be adjusted as desired. A cover 105 protects the teeter bearing 104 from the deleterious effects of the sun and salty air typical of an offshore environment.

Figure 1D:
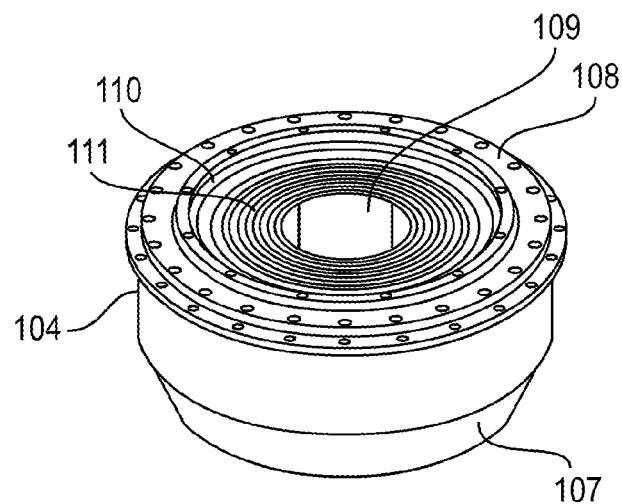

FIG. 1D depicts the teeter bearing 104 removed from the hub 101 and without the cover 105. As shown, the teeter bearing 104 includes an outer shell 107, an inner shell 108, a central sleeve 109, and two couples of metal-elastomeric elements 110 and 111 stacked one into the other. The tapered shape of metal-elastomeric elements 110 and 111, matches the tapered shape of central sleeve 109, the outer shell 107, and the inner shell 108. Accordingly, the preload of the teeter bearing 104 can be obtained by axially forcing the inner shell 108 against the outer shell 107 by tightening the associated fixing screws 115. The arrangement of components encompassed by the invention allows the preassembly of the teeter bearing 104 prior to its installation into the hub 101 with its initial preload adjusted at the manufacturer.

Figure 1E:
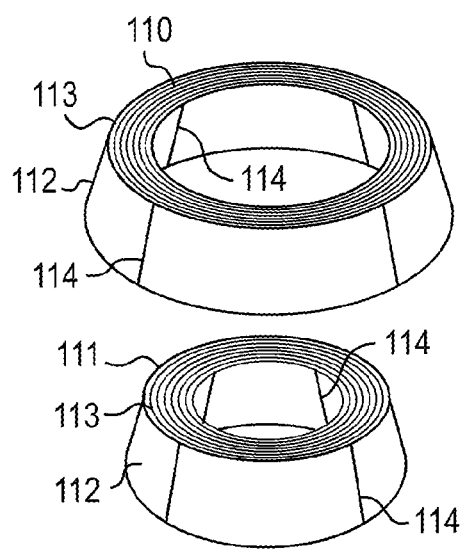

FIG. 1E shows metal-elastomeric elements 110 and 111 in detail. As shown, both metal-elastomeric elements 110 and 111 are tapered. The number of such elements can be changed as needed. Furthermore, the metal-elastomeric elements can be composed of only one annular element or composed of more sectors if desired. Keys 114 have been installed to prevent mutual rotation of the parts, however, other anti-rotation devices can be used. The metal-elastomeric elements 110 and 111 are each composed of alternating metal shims 112 and elastomeric bonded layers 113. The number and thickness of the shims 112 and elastomeric layers 113 can be adjusted as desired.

Figure 2A:
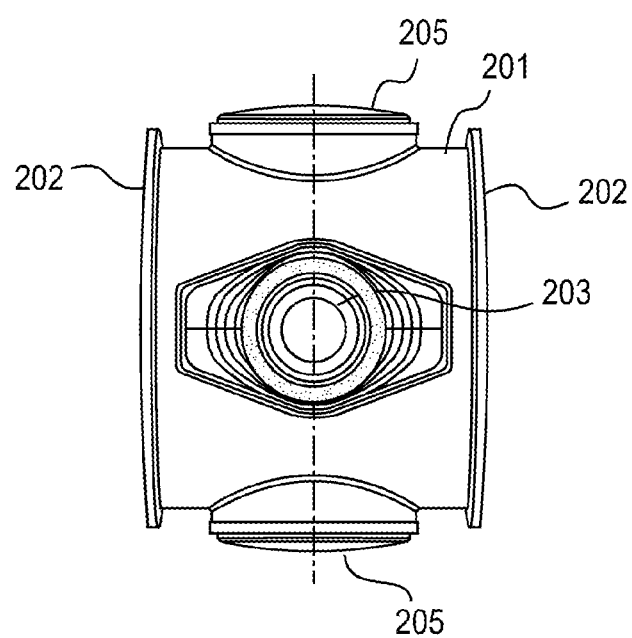
FIGS. 2A, 2B, 2C, 2D, and 2E depict another embodiment of the invention, from different perspectives.

Another embodiment of the invention is shown in FIGS. 2A, 2B, 2C, 2D, and 2E. FIG. 2A shows an arrangement of two-bladed rotor and associated hub. The hub 201 is essentially a shell in which the two blades (not shown) are mounted at attachment points 202. The hub 201 contains an opening for a shaft head 203 and two openings located on opposite sides for teeter bearings 204 (not shown in this Figure) that are mounted under a cover 205.

Figure 2B:
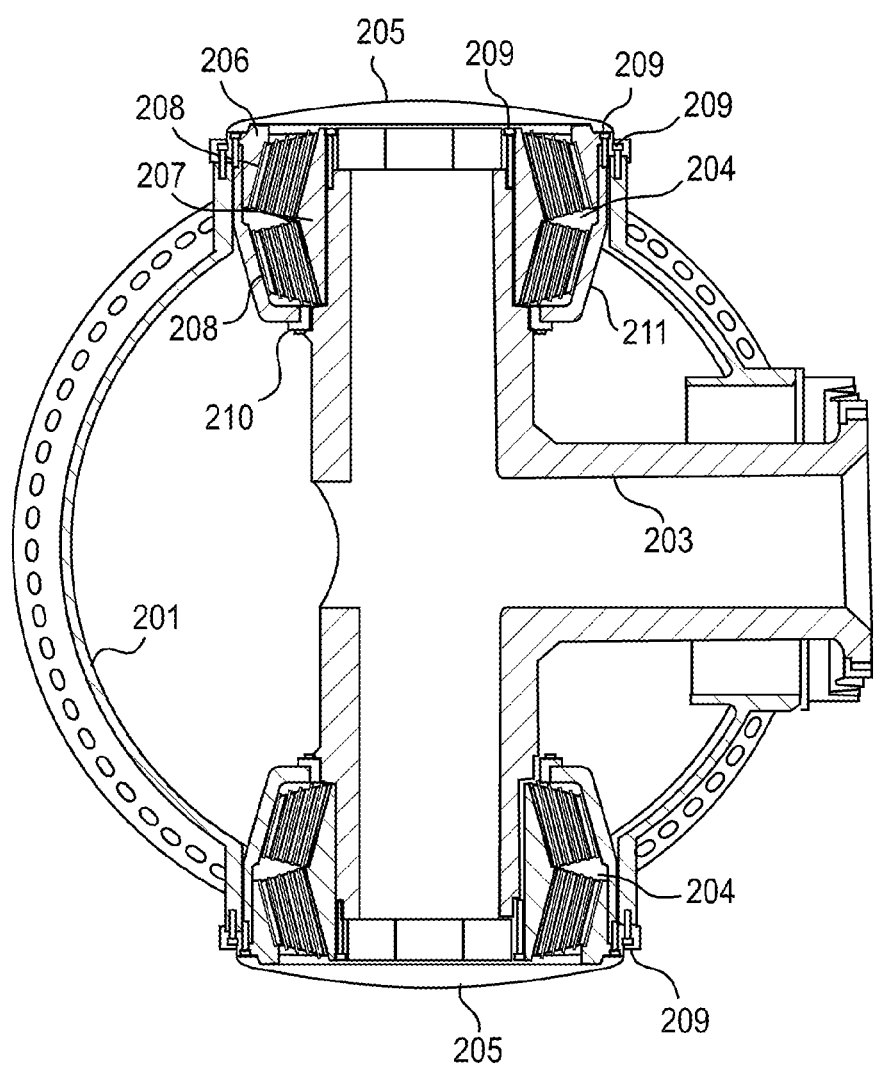

FIG. 2B is a cross-sectional view of the hub assembly, and shows the inside of the hub 201, along with the shaft head 203 and two teeter bearings 204 located on opposite horns of the shaft head 203. FIG. 2B also shows the arrangement of the teeter bearings 204 and components between the horns of the shaft head 203 and the hub 201. Further, a cross-section of the teeter bearing 204 is presented, with a detailed view of the outer shell 211, the segmented inner shell 206, the segmented central sleeve 207, and two couples of metal-elastomeric elements 208 stacked one against the other. In order to avoid mutual rotation of the parts, the elements 208 have square or quasi-square ends that fit the corresponding recesses machined in the adjoining parts. Undesired mutual rotation can also be prevented with the use of keys, pins, and other devices with similar functions. The teeter bearing 204 is fixed to the hub 201 and to the shaft head 203 by screws 209, although other fastening devices, can be used. A slide bearing 210, which protects teetering bearings from stress peaks and assists in the event of elastomeric layer failure, is installed and secured to the inner end of the outer shell 211. The shape and location of the slide bearing 210 can be modified as needed. In addition, the invention encompasses multiple sliding bearings, which could be mounted internally or parallel to the metal-elastomeric elements 208 as needed. In certain embodiments, position sensors can be installed to monitor the displacements of the teeter bearing 204 in operation. A cover 205 protects the teeter bearing 204 from the deleterious effects of sun and salty air in offshore environments.

Figure 2C:
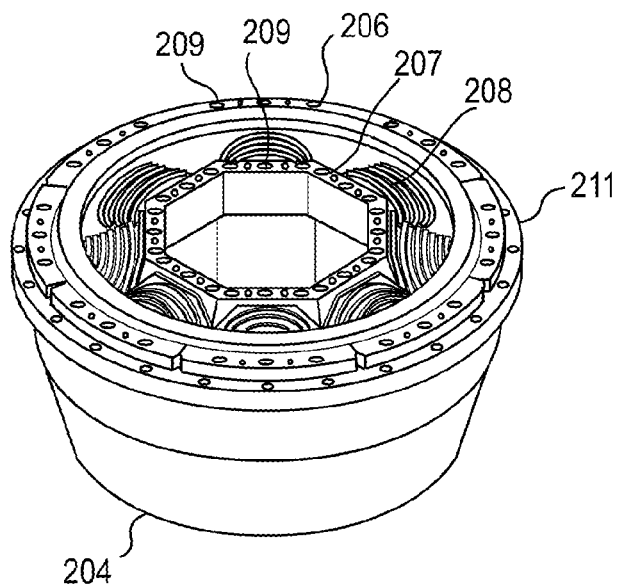

FIG. 2C presents a magnified view of the teeter bearing 204. The teeter bearing 204 includes an outer shell 211, a segmented outer sleeve 206, a segmented central sleeve 207, and two segmented metal-elastomeric elements 208 arranged in two circular arrays stacked one against the other. In certain embodiments, the segments of the outer sleeve 206, the central sleeve 207, and the metal-elastomeric elements 208 are obtained by cutting the hinge by radial planes along the axis of the horn of the shaft head 203. The number of segments in the various sleeves can be modified as needed. In certain embodiments, the sleeves are not segmented. Each element of the central sleeve 207 can be double wedged shaped and is jointed to the horn of the shaft head 203 by screws 209. Each component of the outer sleeve 206 can be simple wedge shaped and is jointed to the outer shell 211 by the screws 209. Furthermore, each double element of the metal-elastomeric elements 208 is confined within the space between the outer shell 211, the component of the central sleeve 207 and the component of the outer sleeve 206.

Figure 2D:
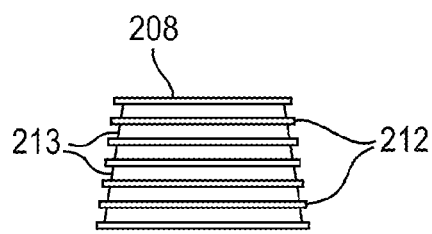
Figure 2E:
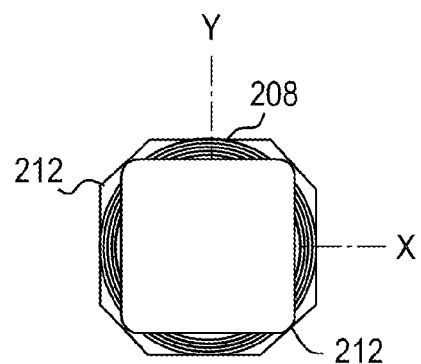

As shown in FIG. 2D, the metal-elastomeric elements 208 are each composed of metal shims 212 interposed by elastomeric bonded layers 213. The number and thickness of the layers can be adjusted as desired. The metal shims 212 at the end of each metal-elastomeric element 208 fit the corresponding recesses machined in the adjoining parts, and as shown in FIG. 2E may have a square or quasi-square shape. The fitting of the squared end into the recessed part helps prevent undesired rotation of the metal-elastomeric elements 208. Other means can be used to prevent rotation, including but not limited, to keys or pins. The geometry of the end shims 212 allows mounting the metal-elastomeric elements 208 in two possible positions, with either the x-axis or the y-axis parallel to the axis of the horn of the shaft head 203, as shown in FIG. 2E. The tapered shape of the metal-elastomeric elements 208 matches the tapered shape of the central sleeve 207, the outer shell 211, and the outer sleeve 206. Accordingly, each metal-elastomeric element 208 of the teeter bearing can be preloaded separately by forcing the central sleeve element 207 by tightening its fixing screws 209 for the inner array of metal-elastomeric elements 208 and the outer sleeve element 206 into the outer shell 211 by tightening its screws 209 for the outer array of metal-elastomeric elements 208. The resulting preload will have an axial component as well as a radial component. Depending on the specific application, the tapered shape of the metal elastomeric element 208 can be designed to meet the required ratio of these two components. FIG. 2E depicts the tapered shape of the metal-elastomeric elements 208, which in some embodiments, are mounted with the larger diameter against the central sleeve 207 for optimized distribution of the shear stress.

Figure 3A:
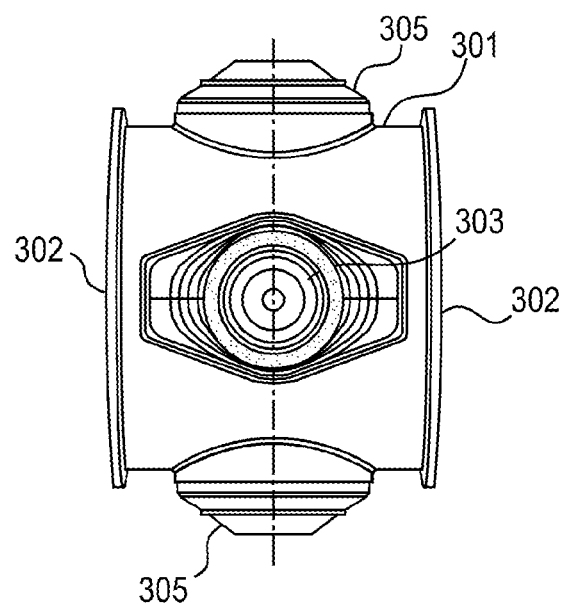
FIGS. 3A, 3B, 3C, 3D, and 3E depict yet another embodiment of the invention, from different perspectives.

Another embodiment of the invention is provided in FIGS. 3A, 3B, 3C, 3D, and 3E. FIG. 3A shows an arrangement of two-bladed rotor and associated hub. The hub 301 is essentially a shell in which the two blades (not shown) are mounted at attachment points 302. The hub 301 contains an opening for a shaft head 303 and two openings located on opposite sides for teeter bearings 304 (not shown in this Figure) that are mounted under a cover 305.

Figure 3B:
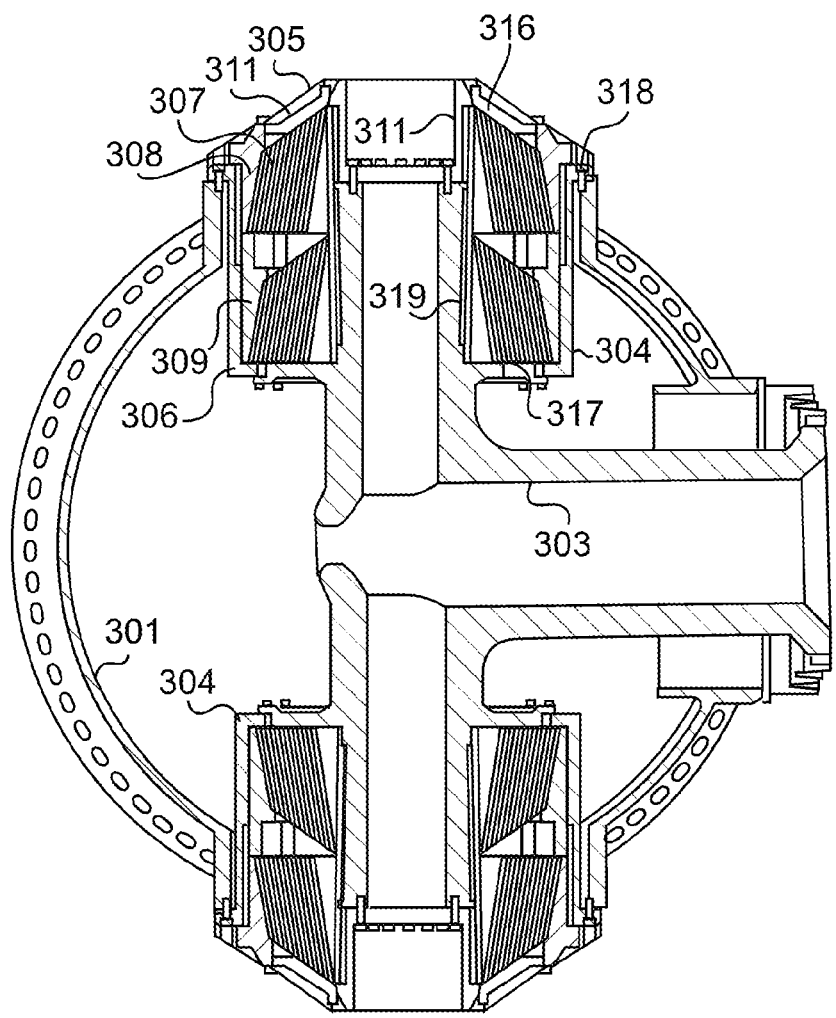

FIG. 3B is a cross-sectional view of the hub assembly, and shows the inside of the hub 301, along with the shaft head 303 and teeter bearings 304 located on opposite horns of the shaft head 303. FIG. 3B shows the arrangement of the teeter bearing 304 and components between the horns of the shaft head 303 and hub 301. As shown in FIG. 3B, the teeter bearing 304 includes an outer shell 306, a double crown of metal-elastomeric elements 307, and a crown of wedges 308 and 309 between the metal-elastomeric elements 307 and the outer shell 306. After positioning the shaft head 303 into the hub 301 and installed the shell 306, the inner crowns of metal-elastomeric elements 307 are installed between the horns of the shaft head 303 and the shell 306, and are secured into their final position by inserting the wedges 309. The outer crowns of the metal-elastomeric elements 307 are installed between the horns of the shaft head 303 and the upper end of the wedges 309 and secured by the insertion of the wedges 308. Both crowns of metal-elastomeric elements 307 are axially restrained by the locking piece 311 along the horn of the shaft head 303. Due to the tapered shape of the metal-elastomeric elements 307, the preload can be obtained by forcing wedges between them and the outer shell 306 for the inner crown and wedges 308 between them and the upper part of the wedges 309 for the outer crown by tightening the wedge fixing screws 310. A gap can be left between the wedge fixing lip and its stop face, to be filled with proper shims. This would permit a later individual adjustment of the preload to compensate for relaxation of the elastomeric compound.

As further shown in FIG. 3B, the outer shell 306 of the teeter bearing 304 is jointed at the hub 301 through a crown of screws 318. In some embodiments, a shim can be used under the flange of shell 306 in relation to the chain of tolerances. There are two sliding bearings, 316 and 317, on each horn of the shaft head 303. The sliding bearings 316 and 317 protect the teeter bearings 304 from stress peaks and help in case the elastomeric layers fail. The sliding bearings 316 and 317 also allow free axial displacement between the horns of the shaft head 303 and the outer shell 306. Sliding bearing 316 is installed on the locking piece 311 and secured by the retaining element 318. Sliding bearing 317 is made of sectors screwed to outer shell 306. The shape, number, and location of the sliding bearings can vary as needed. Also, multiple sliding bearings could be mounted internally or on each metal shim 18 as needed. Furthermore, in certain embodiments, transducers can be installed to monitor radial and angular displacements. In addition, anti-rotation devices, such as keys 319, can be used to prevent mutual rotation of the parts. For the same reason, the metal-elastomeric elements 307 are guided laterally by the wedges 308 and 309 and the outer shell 306. A cover 305 protects the teeter bearing 304 from the deleterious effects of the sun and the salty air in an offshore environment.

Figure 3C:
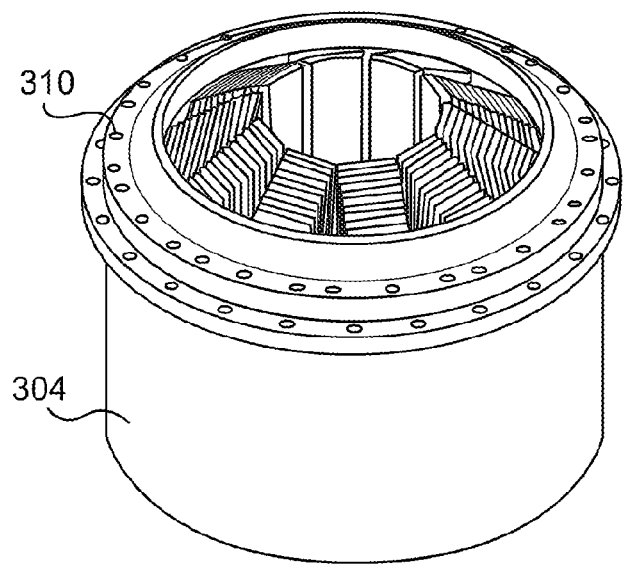
Figure 3D:
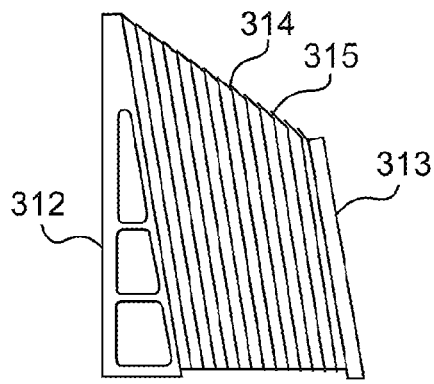
Figure 3E:
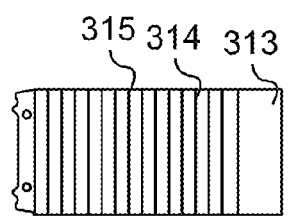

FIG. 3C provides a magnified view of the teeter bearing 304, removed from the hub 301 and without the cover 305. FIG. 3D shows the metal-elastomeric element 307 in greater detail. The metal-elastomeric element 307 has a tapered shape and is composed of a wedge shaped metallic piece 312 that fits the horn of the shaft head 303, an external plate 313 that fits within the recesses of wedges 308 and 309, and metal shims 314 interposed by elastomeric bonded layers 315. The number and thickness of the layers can be modified as needed. In some embodiments of the invention, the metal-elastomeric elements 307 are identical for both crowns, while in other embodiments, the elements 307 are different. Furthermore, the number and shape of the metal-elastomeric elements can be modified as needed. FIG. 3E provides a top view of the metal-elastomeric element 307 shown in FIG. 3D.

The embodiments depicted above describe a hinge assembly, where the link between the hub of a two-bladed turbine rotor and the shaft head is achieved through a teetering hinge that permits the flap-wise rotation of the blades without causing yaw and lateral moments. The hinge assembly comprises two preloaded double teeter bearings. Each double teeter bearing can be composed of two crowns of metal-elastomeric elements constrained between the external metal parts and the diametrically opposed ends, i.e., the horns, of the central T-shaped shaft head. The torsional stiffness of the assembly is provided by the teeters working in parallel and securing substantial stiffness in the radial and axial directions. The number of metal-elastomeric layers can be modified accordingly to limit the shear strains caused by the teetering cycles and also to obtain sufficient compression modulus. The radial sliding bearings encompassed by the invention limit the radial displacement and consequent possible damage of the elastomeric elements. The sliding bearings also serve handle the radial load should the elastomeric elements fail. As presented in the embodiments above, assemblies encompassed by the invention can also include sensors able to detect the radial, axial, and torsional deformation of the elastomeric parts as well as teeter covers, to protect the underlying assembly from the harmful effects of the sun and salty air typical of offshore environments.

The use of two double elastomeric bearings in the hinge assembly is able to significantly reduce the drivetrain bending moments that ultimately result in gearbox failure. Other elements depicted in the various embodiments further enhance the reliability and durability of the contemplated hinge assembly as well as its capability to handle high peak loads

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A teetering hinge assembly, the assembly comprising:
a hub comprising a shell;
a T shaped head of a turbine shaft with two horns; and
at least two double elastomeric teeter bearings positioned between the hub shell and the two horns of the T shaped shaft head, wherein each teeter bearing comprises a plurality of metal-elastomeric elements comprising:
a plurality of metal shims; and
a plurality of elastomeric bonding layers; and
wherein the plurality of metal-elastomeric elements are stacked one into the other, such that each metal-elastomeric element comprises a separate preload.

2. The teetering hinge assembly of claim 1, wherein each metal-elastomeric element is preloadable.

3. The teetering hinge assembly of claim 2, wherein the teeter bearing is self-contained.

4. The teetering hinge assembly of claim 3, wherein the teeter bearing is operably configured to not transfer a preload to said hub.

5. The teetering hinge assembly of claim 2, wherein the preload can be changed by a maintenance operation.

6. The teetering hinge assembly of claim 1, wherein the plurality of metal-elastomeric elements of each of the teeter bearings, are sited side by side in the hub, between the hub shell and the horns of the shaft head.

7. The teetering hinge assembly of claim 6, further comprising metallic or composite wedges, for preloading the elastomeric elements, between the hub shell and the metal-elastomeric elements and between the horns and the metal-elastomeric elements.

8. The teetering hinge assembly of claim 7, wherein the wedges are fixed to the hub shell and the horns by screws, and each metal-elastomeric element is independently preloadable by manipulating the screws.

9. The teetering hinge assembly of claim 6, wherein each metal-elastomeric element within the plurality of elements can be individually removed from the hub and replaced by a new element without affecting the stability of the teetering hinge.

10. The teetering hinge assembly of claim 6, wherein the teeter bearing farther comprises one or more radial sliding bearings configured to limit the radial displacement of the metal-elastomeric element between the hub shell and the horns in order to: 1) keep the stability of the teetering hinge in case of a failure of one or more metal-elastomeric elements; and 2) protect the metal-elastomeric material by limiting its radial deformation in case of abnormal external loads.

11. The teetering hinge assembly of claim 6, wherein a ratio between radial and axial preloads can be set by designing the angle of the wedges in view of the expected external loads.

12. The teetering hinge assembly of claim 6, wherein each metal-elastomeric element has two symmetry radial axes (X,Y), at 90 degrees from each other.

13. The teetering hinge assembly of claim 12, wherein each metal-elastomeric element can be rotated by 90 degrees around its longitudinal axis thereby interchanging the position of the X and Y axes to extend the design life of the metal-elastomeric elements.

14. The teetering hinge assembly of claim 1, wherein each metal-elastomeric element can be mounted on any position of the two double teeter bearings.

15. The teetering hinge assembly of claim 1, wherein the number and the size of the metal-elastomeric elements can be chosen to enable the fabrication of teetering hinges for larger turbines.

16. The teetering hinge assembly of claim 1, wherein the number and the size of the metal-elastomeric elements can be chosen to facilitate maintenance and repair of the assembly.

\* \* \* \* \*